Sept. 2, 1924.  M. LOUGHEAD  1,507,390
BRAKING APPARATUS
Filed Jan. 23, 1922
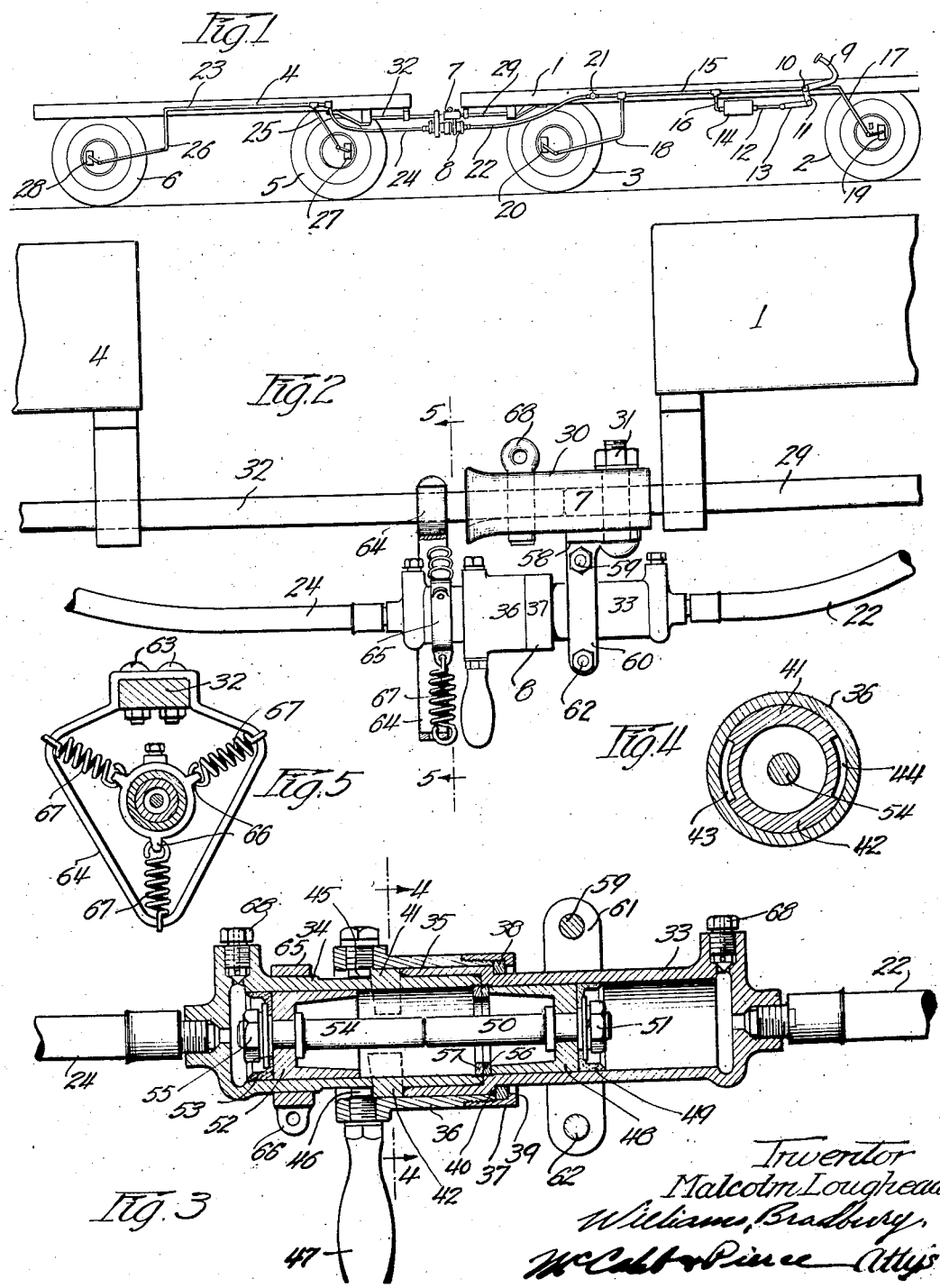

Patented Sept. 2, 1924.

1,507,390

UNITED STATES PATENT OFFICE.

MALCOLM LOUGHEAD, OF DETROIT, MICHIGAN, ASSIGNOR, BY MESNE ASSIGNMENTS TO HYDRAULIC BRAKE COMPANY, OF LOS ANGELES, CALIFORNIA, A CORPORATION OF CALIFORNIA.

BRAKING APPARATUS.

Application filed January 23, 1922. Serial No. 531,146.

*To all whom it may concern:*

Be it known that I, MALCOLM LOUGHEAD, a citizen of the United States, and resident of Detroit, in the county of Wayne and State of Michigan, have invented certain new and useful Improvements in Braking Apparatus, of which the following is a full, clear, concise, and exact description, reference being had to the accompanying drawings, forming a part of this specification.

My invention relates to improvements in braking apparatus for motor vehicles, and is particularly applicable where two vehicles are employed, one being the tractor or motive vehicle and the other being a trailer.

The object of the invention is the provision of means controlled from the tractor for controlling the brakes associated with the wheels of the trailer.

One of the features of the present invention is the arrangement of means in a fluid operated braking system whereby the brakes of the trailer may be operated by the braking pressure produced in the system of the tractor without the passage of fluid from the system of the tractor to that of the trailer.

Another feature of the invention is the provision of a coupling for joining the braking system of the tractor to that of the trailer which will permit the union or separation of the two systems without loss of the braking fluid.

Still another feature of the invention resides in the provision of coupling means which will permit the quick and easy connection or separation of the braking systems of the two vehicles.

Referring now to the drawings, Figure 1 schematically indicates two vehicles provided with the present invention, the vehicle at the right being the tractor, and the one at the left being the trailer;

Figure 2 is a side elevation of the coupling means for joining the draw bars of the tractor to that of the trailer, and also of the coupling means for the braking systems;

Figure 3 shows a practically vertical section of the coupling and pressure transfer arrangement of the braking systems;

Figure 4 is a cross section on substantially the line 4—4 of Figure 3, and

Figure 5 is a section on the line 5—5 of Figure 2.

It has been found difficult to provide braking means on a trailer which could be satisfactorily controlled from the tractor. This difficulty is occasioned by the fact that the distance between the tractor and trailer is constantly changing due to a certain amount of play or lost motion in the coupling devices and the unevenness of the surface over which the vehicles travel, and also by the fact that the direction of movement of the vehicles is almost constantly being changed, thus throwing the vehicles out of alignment.

By the present invention, the brakes in the trailer may be applied with equal force with those of the tractor, regardless of the varying distance between the two vehicles, and also whether they are in alignment at the time the brakes are applied, or are materially out of alignment as when a corner is being turned.

Applicant is aware that in air pressure systems, means are provided whereby the brakes in one or a plurality of trailers may be simultaneously actuated, but the connection which has been formerly used in systems of this character are not applicable to a braking system in which a liquid is used for transmitting the braking pressure, as is contemplated in the present system, for the reason that in the connections used with the pneumatic braking systems the liquid would be lost every time the connection was opened. By the present invention, a connection is provided which will permit the ready connection or separation of the parts of the braking system, but which prevents the loss of liquid from the system.

In the drawings, 1 represents the chassis of the tractor or motive vehicle, which is provided with the usual wheels 2 and 3. 4 indicates the chassis of the trailer carried on the wheels 5 and 6. 7 indicates the coupling device for connecting the draw bar of the tractor to that of the trailer. 8 indicates the coupling device for the fluid braking system. 9 indicates a foot operated brake pedal which is pivotally supported at 10, and is provided with an arm 11 connected to the piston rod 12 by means of a link 13. 14 indicates a fluid pressure cylinder which receives a piston on the end of the piston rod 12. The cylinder 14 is connected to the main tube 15 of the fluid pressure system by the tube 16. 17 and 18 represent branch tubes which extend to the brake cylinders 19 and 20, which may be of any desired character. 21 indicates a valve which may be closed when the tractor is to be used without a trailer so as to prevent the passage of fluid into the tube 22 which extends to the coupling and transfer device 8.

The trailer is provided with a fluid operated braking system similar to that of the tractor except the trailer does not have the equivalent of the foot lever 9 and cylinder 14 and the associated parts. 23 represents the main fluid pressure tube of the system of the trailer which is connected to the coupling and pressure transfer device 8 by the tube 24. 25 and 26 indicate branch tubes which extend to the brake cylinders 27 and 28.

While each of the vehicles illustrated is shown with only two wheels, it is to be understood that each is provided with the usual four wheels, and that branches such as 17, 18, 25 and 26 extend to the brake cylinders of the opposite wheels. The tubes 22 and 24 which connect the main pressure tubes 15 and 23 to the pressure transfer device 8 may consist wholly, but preferably only in part, of flexible tubing. 29 indicates the draw bar of the tractor to which is secured the coupling socket 30 by means of the bolt 31. 32 indicates the draw bar of the trailer, the forward end of which is received in the open end of the coupling member 30. The draw bar 32 is retained in the socket 30 by a pin 68 which passes downwardly through aligned openings in the socket and draw bar.

The pressure transfer and coupling device 8 includes the cylinders 33 and 34 which are brought into abutting position as shown in Figure 3, and are locked in this position by means to be presently described. Cylinder 33 is provided with an enlarged portion 35 arranged to receive the end of the cylinder 34.

Positioned about the enlarged portion 35 is a sleeve 36. In screw threaded engagement with the end of the sleeve 36 is a collar 37. A retaining ring 38 is provided between the inwardly extending flange 39 of the collar 37 and the shoulder 40 on the enlarged portion 35 of cylinder 33. By this means the sleeve 36 is permitted to rotate about the portion 35, but is prevented from being displaced longitudinally to the left. The cylinder 34 is provided with a pair of inclined ridges 41 and 42 which lie in substantially the same transverse plane but are separated by the notches or openings 43 and 44. Extending inwardly through the left end of the sleeve 36 is a pair of bearing lugs 45 and 46. The lug 46, if desired, may be formed as an extension of the handle 47 by means of which the sleeve 36 may be rotated.

The cylinders 33 and 34 are joined by slipping the end of the cylinder 34 within the enlarged portion 35 of the cylinder 33. During this operation the lugs 45 and 46 should be so arranged as to pass through the notches 43 and 44. By means of the handle 47, the sleeve 36 is then rotated to cause the lugs 45 and 46 to engage the inclined ridges 41 and 42 and thus force and retain the cylinders in rigid engagement.

Positioned within the cylinder 33 is a piston 48 provided with a cup leather 49. Extending through the piston 48 is a rod or projection 50, the rod, piston and cup leather being all clamped together by means of the nut 51. Within the cylinder 34 is a similar piston 52, cup leather 53, projection or rod 54 and nut 55. The rods 50 and 54 are arranged in alignment and the ends remote from the pistons are adapted to be brought into engagement as illustrated in Figure 3.

Arranged in screw threaded engagement with the inner surfaces of the cylinders 33 and 34 are the washer-like abutments 56 and 57 respectively which prevent the passage of the pistons 48 and 52 from their respective cylinders. The remote ends of the cylinders 33 and 34 are connected to the fluid pressure tubes 22 and 24 respectively, as above described.

Secured to the lower side of the coupling socket 30 by means of the bolt 31 is a perforated lug 58 to which is secured by means of the bolt 59 a pair of substantially semicircular members 60 and 61, these members being secured in engagement with the cylinder 33 by means of the bolt 62.

Mounted on the draw bar 32 adjacent the end thereof, as by the bolts 63, is a yoke 64. Mounted about the cylinder 34 is a sleeve or collar 65 provided with a plurality of lugs 66. Springs 67 are provided, one end of each of these springs being secured to a lug 66, the opposite end being secured to the yoke 64, as indicated in Figure 5. By this means, the cylinder 34 is substantially supported in such a manner as to be readily adjusted to place it in alignment with the cylinder 33. This supporting arrangement also permits the cylinder 34 to remain in alignment with the cylinder 33, even when the vehicles are thrown out of alignment as by the uneven sections of the road or when turning. As the handle 47 extends downwardly when the coupling device is in operative position, the weight of the handle tends to maintain the coupling in its operative position.

The operation of the braking system herein described is as follows:

It is, of course, understood that normally all the openings in the tubes and cylinders, except that between the pistons 48 and 52, are filled with some relatively non-compressible fluid such as oil, glycerine or alcohol, the escape of the air during the filling process being facilitated by loosening the bleeder screws 68. It will also be understood that in the normal condition of the apparatus, when the brakes are not in operative position, the piston 48 will be positioned at the extreme right in the cylinder 33, and the piston 52 will be correspondingly positioned at the right in the cylinder 34, the rods 50 and 54 being in engagement, or substantially in engagement, the cavity which then exists at the left of the piston 34 being filled with the brake operating fluid.

When it is desired to apply the brakes to the vehicles, the operator will depress the foot lever 9, and by so doing will force the fluid out of the cylinder 14 and into the pipes or tubes of the braking system. The fluid which is forced from the cylinder 14 will act through the tubes 15, 17 and 18 directly on the pistons in the cylinders 19 and 20 to apply the brakes to the wheels of the forward or tractor vehicle. This fluid pressure will also be distributed to the tube 22 and a portion of it will enter the cylinder 33.

When the fluid is forced through the tube 22 into the cylinder 33, the piston 48 will be moved to the left as viewed in Figure 3, which will cause a corresponding movement of the piston 52 within the cylinder 34. Thus, the fluid which is normally within the left portion of the cylinder 34 will be forced from this cylinder and through the tube 24 into the braking system of the rear vehicle or trailer. This fluid pressure will be transmitted through the tubes 23, 25 and 26 to the brake cylinders 27 and 28, thus causing the brakes to be applied to the wheels of the trailer. It will be readily understood that by the present means, the brakes of the trailer will be invariably applied with substantially the same pressure as are those of the forward vehicle or tractor.

As the pistons 48 and 52 together with their cup leathers 49 and 53 form a fluid-tight connection with the walls of the cylinders 33 and 34, and as these pistons are prevented from passing out of the cylinders by the retaining washers 56 and 57, it is readily seen that the fluid used in the braking system will not be lost whenever a connection is broken or made. This is a material feature of the invention, as in the ordinary use of tractors with trailers, it is customary to frequently shift the tractor from one trailer to another.

While in the present disclosure but one trailer has been disclosed, it is readily apparent that the invention may be applied to a plurality of trailers, to do this merely involving the correct proportioning of the various fluid cylinders.

Although but a single embodiment of the invention is shown in the accompanying drawings and described in the specification, it is to be understood that various modifications of this embodiment are contemplated and the invention is, therefore, to be limited merely by the scope of the appended claims.

What I claim is new and desire to secure by Letters Patent is:—

1. In a braking system, two sets of braking apparatus, each set including brake cylinders and tubes for conveying fluid thereto, means for forcing fluid under pressure into the tubes of one set of apparatus, means actuated by the pressure in said tubes of one set for creating pressure in the tubes of the other set, and means for preventing the passage of fluid from the tubes of one set to those of the other.

2. In a braking system, two sets of braking apparatus, each set including brake cylinders and tubes for conveying fluid thereto, means for forcing fluid under pressure into the tubes of one set of apparatus, a transfer cylinder, a piston within said transfer cylinder, said transfer cylinder being joined to the said tubes of one set, a second transfer cylinder, a piston within said second transfer cylinder, and a mechanical connection between said pistons, said second transfer cylinder being joined to the other set of braking apparatus.

3. In a coupling for the tubing of fluid pressure operated brake systems, two cylinders, pistons within said cylinders respectively, quick detachable means for joining said cylinders with their normally open ends adjacent each other, and projections, one extending from each of said pistons toward the other, said projections being arranged substantially in alignment and in abutting relation.

4. In a coupling for the tubing of fluid pressure operated brake systems, two cylinders, pistons within said cylinders respectively, means for joining said cylinders with their normally open ends adjacent each other, a separable mechanical connection between said pistons, and means for retaining said pistons within said cylinders respectively when said cylinders are separated.

5. A device for transferring fluid pressure from one receptacle to another, comprising a pair of cylinders, pistons within said cylinders respectively, quick detachable means for joining said cylinders with their normally open ends in abutting relation and in substantial alignment, and rods, one projecting from each of said pistons and toward the other, said arms being arranged normally abutting and in substantial alignment.

6. In a device for transferring fluid pressure from one receptacle to another, two cylinders, pistons within said cylinders respectively, a mechanical connection between said pistons, and quick detachable means for joining said cylinders with their open ends adjacent each other, said means comprising a sleeve secured to one of said cylinders adjacent one end thereof, and means for securing said sleeve to the other cylinder.

7. In a device for transferring fluid pressure from one receptacle to another, a pair of cylinders, pistons within said cylinders respectively, mechanical means for transferring motion in one piston to the other, and means for joining said cylinders with their normally open ends adjacent said means, comprising a sleeve rotatably mounted on one of said cylinders, a lug on the other said cylinder, and means on said sleeve for engaging said lug.

8. In a device for transferring fluid pressure from one receptacle to another, a pair of cylinders, pistons within said cylinders respectively, means for transferring motion of one of said pistons to the other, and means for securing said cylinders with their normally open ends adjacent each other, said means comprising a sleeve rotatably mounted on one of said cylinders, a substantially circumferential ridge on the other said cylinder, and a lug on said sleeve for engaging said ridge.

9. In a braking system, two sets of braking apparatus, each set including fluid operated brake mechanism, and tubes for conveying fluid under pressure thereto, means for forcing fluid under pressure into the tubes of one set of apparatus, and means actuated by the pressure in the tubes of one set for creating pressure in the tubes of the other set, said means comprising a pair of cylinders, pistons, one in each of said cylinders, and mechanical means for transferring movement from one of said pistons to the other.

10. In a device for transferring fluid under pressure from one receptacle to another, a cylinder, a second cylinder, said cylinders being arranged with their normally open ends in abutting relation, pistons within said cylinders, projections, one on each of said pistons extending toward the other, said projections being arranged in alignment and in abutting relation, quick detachable means for securing said cylinders together, and means carried by said cylinders respectively for preventing the escape of its respective piston therefrom when said cylinders are separated.

In witness whereof, I hereunto subscribe my name this 9th day of January, 1922.

MALCOLM LOUGHEAD.

Witnesses:
ALBIN C. OHLBERG,
DAGMAR PETERSON.